United States Patent [19]

Cavanagh et al.

[11] Patent Number: 4,869,149
[45] Date of Patent: Sep. 26, 1989

[54] AT-SEA RECOVERY HANDLING SYSTEM

[75] Inventors: Robert D. Cavanagh, Middletown; Paul E. Nelson, Newport, both of R.I.

[73] Assignee: The United States of America as represented by the Secretary of the Navy, Washington, D.C.

[21] Appl. No.: 254,555

[22] Filed: Oct. 6, 1988

[51] Int. Cl.⁴ .................. F41F 5/02; B63B 27/16; B66C 1/12
[52] U.S. Cl. ....................... 89/1.58; 114/244; 114/153; 212/259; 244/137.4; 194/86.26
[58] Field of Search ............ 114/253, 254, 244, 20.1; 212/259, 190; 244/137.4; 294/86.26; 89/1.58

[56] References Cited

U.S. PATENT DOCUMENTS

| | | | |
|---|---|---|---|
| 2,780,196 | 2/1957 | Jareckie | 114/244 |
| 3,032,365 | 5/1962 | Campbell | 114/20.1 |
| 3,554,468 | 1/1971 | McVicar | 244/137.4 |
| 3,647,253 | 3/1972 | Hettinger et al. | 114/20.1 |
| 3,805,977 | 4/1974 | Fritzsche et al. | 244/137.1 |
| 4,009,635 | 3/1977 | Munro et al. | 89/1.58 |
| 4,132,973 | 1/1979 | Orme | 114/244 |
| 4,388,709 | 6/1983 | Reed et al. | 114/244 |
| 4,658,750 | 4/1987 | Malcosky | 114/242 |

FOREIGN PATENT DOCUMENTS 0604742  4/1978  U.S.S.R. ................ 114/258

Primary Examiner—David H. Brown
Attorney, Agent, or Firm—Arthur A. McGill; Prithvi C. Lall; Michael J. McGowan

[57] ABSTRACT

A stabilizing system for use in conjunction with a crane/boom in which an object is held fast to a foam cushion within the system. A hook that forms part of the system grasps a sling holding the object and secures the object against the foam cushion. The object can be aligned by being rotated or tilted while held fast to the cushion. The object is prevented from swinging and swaying, thereby greatly reducing danger.

2 Claims, 1 Drawing Sheet

AT-SEA RECOVERY HANDLING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to the retrieval and handling of objects and in particular comprises a stabilizing device for securing an object lifted from the sea as to enable improved handling of the object.

2. Description of the Prior Art

Prior to the present invention when an object such as a torpedo was found floating vertically at sea a crew was launched in a rubber boat to the torpedo. The crew installed a long leg nose cage having a lifting sling around the torpedo. The torpedo was then towed back to the vicinity of the ship in an area where a seacrane or boom and other retrieval gear was situated. Then using a snap shackle, a connection was made between the nose cage lifting sling and a winch cable. The winch cable extended from the seacrane or boom and was connected to the nose cage lifting sling. The torpedo was then winched from the water and the seacrane or boom was trained inboard over the ship. The torpedo was then placed in a deck cradle. One of the dangers in this method was that in rough sea conditions the torpedo or load would tend to swing and sway out of control.

SUMMARY OF THE INVENTION

In the present inventive system a foam stabilizing device is pivotly mounted to the end of the seacrane or boom. The foam stabilizing device has its own rotational components. The objects such as a torpedo or load are firmly secured by abutting the foam portion of the stabilizing device. This gives a controlled motion and eliminates the undesirable swinging and swaying problems in the prior art.

DESCRIPTION OF THE PREFERRED EMBODIMENT

Figure 1:
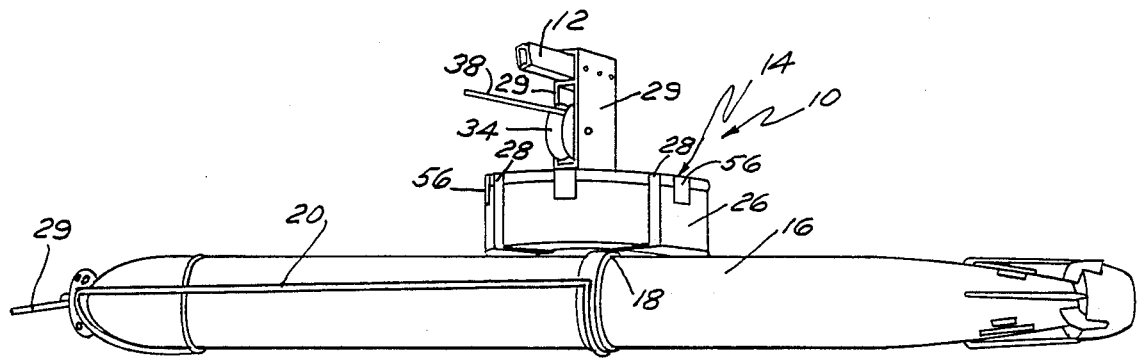
FIG. 1 shows a pictorial representation of the operation of the foam stabilizing system in accordance with the present invention operating on a load.
Figure 2:
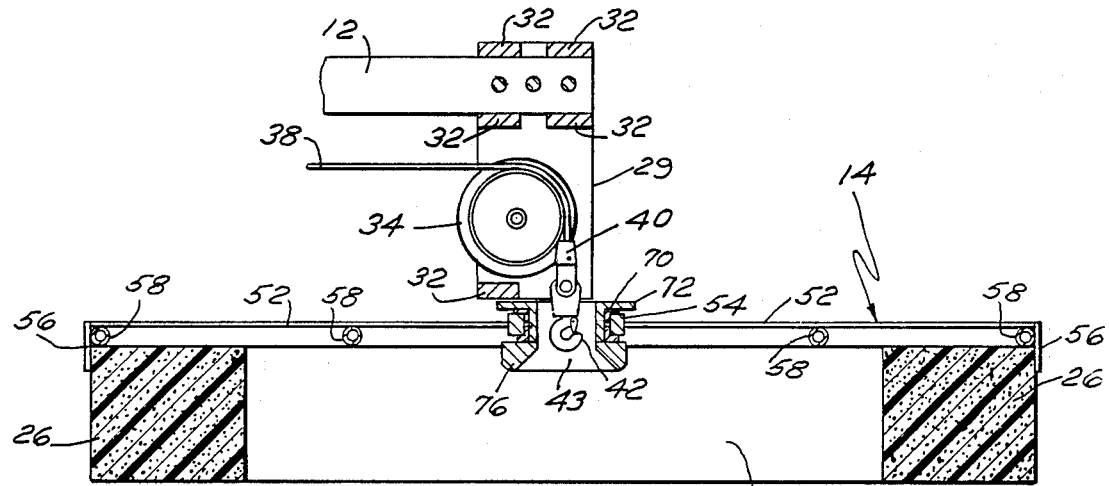
FIG. 2 shows a cross-sectional view of the foam stabilizing system of FIG. 1.

Refer now to FIGS. 1 and 2. In FIG. 1 there is shown a view of the stabilizing system 10 in operation. FIG. 2 shows a cross-sectional view of the components of the stabilizing system in more detail. The stabilizing system 10 is rigidly secured to a seacrane or boom 12. The stabilizing system 10 comprises plates 29, a lifting cable 38 with swivel hook 42, a stabilizer 14, a sheave 34, and a foam cushion 26. The swivel hook 42 connects to the lifting fixture of the object; for a torpedo 16 this is the lifting sling 18 of a long leg nose cage 20. The object, torpedo 16, after being lifted from the water is firmly abutted against the foam cushion 26. When lifting a torpedo, rope 29 is attached to the long-leg nose cage 20 for rotating the torpedo 16 when lowering to a deck cradle (not shown).

Refer now to FIG. 2 for a more detailed explanation of the stabilizing system 10. Plates 29 are firmly secured to the arm of the seacrane 12. A sheave 34 is rotatably connected to the plates 29. A winch cable 38 extends around the sheave 34 to an open spelter socket 40 that holds a swivel hook 42. The swivel hook 42 is shown extending into an aperture 43. The swivel hook 42 holds the load such as the torpedo 16 by grasping the lifting sling 18 of the long leg nose cage 20 as shown in FIG. 1.

Refer now to the stabilizer 14 in all FIGS. The foam cushion 26 is attached to the stabilizer 14 with straps 28. The foam cushion 26 has an aperture 50 through its axis. The stabilizer 14 supports the foam cushion 26. The stabilizer 14 is comprised of a plurality of metal bars 52 extending in a radial direction from a hub 54. Bars 56 extend at right angles to metal bars 52 at the outer circumference. A pair of circular tubes 58 connect to metal bars 52.

Refer again to FIGS. 2 and 3. A split bushing 70 abuts and holds hub 54. A stabilizer support 72 connects to funnel 76. The stabilizer support 72 holds hub 54 so that stabilizer 14 is free to rotate.

Figure 3:
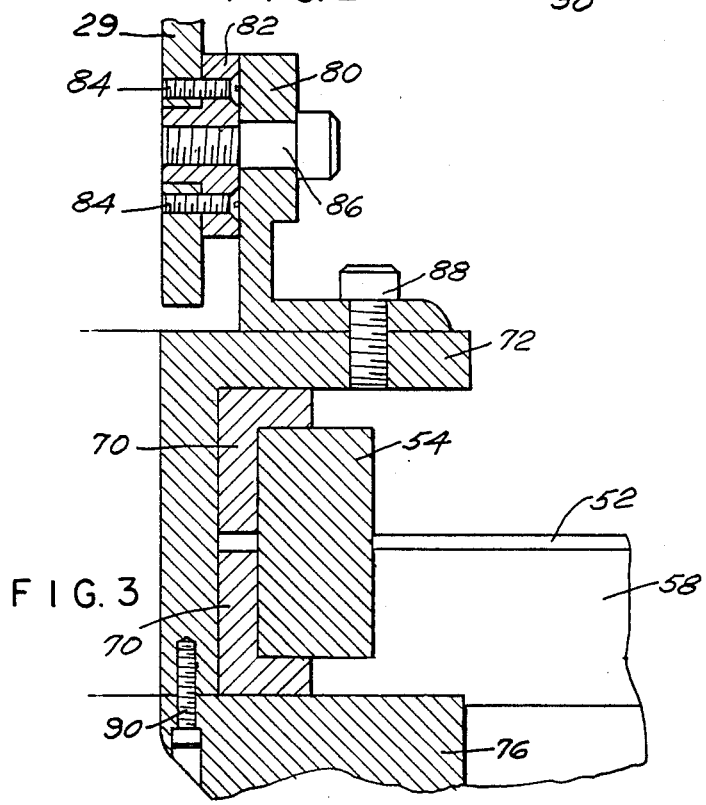
FIG. 3 shows a view of the swivel arrangement of the foam stabilizing system of FIG. 1.

Refer now to FIG. 3. It is a partial side view of FIG. 2 showing a swivel arrangement. Angle 80 swivels on the shoulder of shoulder screw 86. This permits the entire foam stabilizer to pivot. Shoulder screw 86 connects to spacer 82 which is connected to plates 29 by screws 84. Screw 88 connects angle 80 to stabilizer support 72. Screw 90 connects funnel 76 to stabilizer support 72.

Refer now to all the figures for an example of the operation of the stabilizing system 10. For clarity, several well-known objects and a crew, that are not shown in the drawings are used in the description. The description helps to show the difference between the present inventive device and the components mentioned in the Description of the Prior Art.

A recovery vessel holding the seacrane or boom 12 and stabilizing system 10 approaches the torpedo 16. When the vessel is two hundred yards downwind of the torpedo 16, a rubber boat and crew with recovery equipment aboard is launched. The rubber boat departs the vessel, approaches the torpedo 16, and the crew installs the nose cage 20 over the torpedo 16. The rubber boat crew then attaches the swivel hook 42 end of the winch cable to the lifting sling 18 of the nose cage 20. The torpedo 16 is hoisted flush against the foam cushion 26. The crane/boom 12 is turned inboard and the lifted torpedo 16 is aligned by rotation and/or tilting by use of the towline rope 29. The torpedo is lowered and secured on a deck cradle.

The above inventive device was explained for the recovery of a cylindrical object in water. Clearly it could be used for other objects both at sea and on land. It gives superior control to the lifting and moving of fragile objects than heretofore realized.

It will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. A stabilizing system for use with a crane in moving an object comprising:
   a first structure adapted to be rigidly connected to said crane;
   a second structure connected to said first structure with a swivel means for tilting said second structure with respect to said first structure, said second structure further having an aperture;
   a stabilizer having a hub, said stabilizer connected to said second structure with a rotatable means for having said hub held by said second structure so that said stabilizer is free to rotate on its hub around said second structure;
   a cushion connected to said stabilizer, said cushion having an aperture that extends said second structure's aperture;
   a sheave rotatably connected to said first structure;
   grasping means extending around said sheave and through said second structure's and said cushion's apertures for connecting to said object and for placing and holding said object flush against said cushion.

2. A stabilizing system according to claim 1 wherein said grasping means comprises:
   a lifting cable;
   an open spelter socket connected to said lifting cable; and
   a swivel hook connected to said open spelter socket.

* * * * *